United States Patent
Jungwirth

(10) Patent No.: US 10,618,264 B2
(45) Date of Patent: Apr. 14, 2020

(54) APPARATUSES AND METHODS TO PREVENT OR MINIMIZE THE EFFECT OF VOIDS IN BONDED SYSTEMS

(71) Applicant: The Boeing Company, Huntington Beach, CA (US)

(72) Inventor: Douglas R. Jungwirth, Porter Ranch, CA (US)

(73) Assignee: THE BOEING COMPANY, Chicago, IL (US)

(*) Notice: Subject to any disclaimer, the term of this patent is extended or adjusted under 35 U.S.C. 154(b) by 943 days.

(21) Appl. No.: 14/554,557

(22) Filed: Nov. 26, 2014

(65) Prior Publication Data
US 2016/0144593 A1 May 26, 2016

(51) Int. Cl.
*H01L 31/042* (2014.01)
*H01L 31/18* (2006.01)
(Continued)

(52) U.S. Cl.
CPC .......... *B32B 37/1018* (2013.01); *B32B 37/06* (2013.01); *B32B 2305/72* (2013.01);
(Continued)

(58) Field of Classification Search
CPC ... B32B 37/003; B32B 3211/12; B32B 37/12; B32B 37/1207; B32B 37/1215; B32B 37/1284; B32B 3/26; B32B 37/06; B32B 37/10; B32B 37/14; H01L 2224/45147; H01L 2924/013; H01L 2924/01029; H01L 2224/73265; H01L 31/042; H01L 31/18; C22C 9/00; B23K 35/302; B23K 2203/12; H01B 1/026; B65D 90/022; B65D 90/505; B29C 70/547
(Continued)

(56) References Cited

U.S. PATENT DOCUMENTS 4,414,961 A * 11/1983 Luebke .................. F24S 10/80
126/646
5,728,230 A 3/1998 Komori et al.
(Continued)

OTHER PUBLICATIONS

Cotton Incorporated, http://www.cottoninc.com/product/NonWovens/Nonwoven-Technical-Guide/Cotton-Morphology-And-Chemistry /, (Cotton Inc.). (Year: 2017).*
(Continued)

*Primary Examiner* — Andrew T Piziali
(74) *Attorney, Agent, or Firm* — MH2 Technology Law Group LLP

(57) ABSTRACT

Methods, apparatuses, and systems are disclosed for manufacturing a structure having layers that may operate in low pressure or vacuum environments. More particularly, methods, apparatuses, and systems are disclosed for minimizing the effects of voids by eliminating their contents in layers of bonded structures. In some implementations, a method for improving bonding within a layered structure comprises applying a bonding material layer to a substrate layer; disposing a wicking material in the bonding material layer, said wicking material having an outer surface; applying a surface material layer to the bonding material layer to form a layered structure; and curing the layered structure.

21 Claims, 8 Drawing Sheets

(51) Int. Cl.
B32B 37/10 (2006.01)
B32B 37/06 (2006.01)

(52) U.S. Cl.
CPC ....... *B32B 2457/12* (2013.01); *B32B 2605/00* (2013.01); *B32B 2605/18* (2013.01)

(58) Field of Classification Search
USPC ............ 442/1; 428/36.5, 304.4, 311.11, 167, 428/188, 398; 220/564.1, 62.19
See application file for complete search history.

(56) References Cited

U.S. PATENT DOCUMENTS

| | | | |
|---|---|---|---|
| 5,799,817 A * | 9/1998 | Sharp | B65D 90/505 |
| | | | 220/567.1 |
| 6,063,996 A * | 5/2000 | Takada | F24J 2/5235 |
| | | | 126/621 |
| 6,175,075 B1 | 1/2001 | Shiotsuka et al. | |
| 6,224,016 B1 * | 5/2001 | Lee | B64B 1/14 |
| | | | 136/245 |
| 6,986,229 B2 * | 1/2006 | Collison | B32B 5/08 |
| | | | 156/71 |
| 8,263,854 B2 | 9/2012 | Byun et al. | |
| 8,847,063 B2 | 9/2014 | Terreau et al. | |
| 8,847,064 B2 | 9/2014 | Terreau et al. | |
| 2004/0146696 A1 * | 7/2004 | Jones | B29C 70/20 |
| | | | 428/167 |
| 2012/0088050 A1 * | 4/2012 | Lavature | B32B 5/028 |
| | | | 428/41.1 |
| 2013/0112625 A1 * | 5/2013 | Bahukudumbi | B01J 20/28007 |
| | | | 210/660 |
| 2015/0013876 A1 | 1/2015 | Inoue et al. | |

OTHER PUBLICATIONS

"Physical Constants of Organic Compounds," in CRC Handbook of Chemistry and Physics, 98th Edition (Internet Version 2018), John R. Rumble, ed., CRC Press/Taylor & Francis, Boca Raton, FL. (CRC). (Year 2018).*
"NASA Facts: A History of U.S. Space Stations," Jun. 1997 (NASA). (Year: 1997).*
NIH PubChem Database Asbestos https://pubchem.ncbi.nlm.nih.gov/compound/25477 (Year: 2019).*
Medronho et al., Rationalizing cellulsoe (in)solubility, Cellulose (2012) 19:581-587 (Year: 2012).*
"Physical Properties of Selected Polymers" in CRC Handbook of Chemistry and Physics, 98th Edition (Internet Version 2018), John R. Rumble, ed., CRC Press/Taylor & Francis, Boca Raton, FL. (CRC). (Year: 2018).*

* cited by examiner

APPARATUSES AND METHODS TO PREVENT OR MINIMIZE THE EFFECT OF VOIDS IN BONDED SYSTEMS

TECHNOLOGICAL FIELD

The present disclosure relates to methods, apparatuses, and systems for manufacturing layered structures designed to operate in low pressure/vacuum environments. More particularly, the present disclosure relates to methods, apparatuses, and systems for eliminating or minimizing the effects of voids and their contents in layers of bonded structures and systems.

BACKGROUND

As is known, some systems, during the manufacturing process, require the application of one or more layers of material bonded together. Bonding processes utilize epoxy, glue, adhesive or other compounds, some of which are cured, for example, with exposure to certain wavelengths of electromagnetic radiation, or by applying heat.

During the bonding process, a void (or "bubble") of unwanted gas or other material may be introduced to the system between a substrate material and another layer bonded to the substrate material. Such voids and their contents are particularly problematic in vacuum or near-vacuum applications and environments, where a volume of typically unwanted and undetected material, such as, for example, a gas, is contained within the void and becomes "trapped". Such a gaseous volume in a void can expand when the system is placed under vacuum, or in a near-vacuum environment, such as, for example, space. Under ambient conditions such structures are often able to perform according to their intended standards without a deleterious effect. However, in low pressure environments including those approaching a complete vacuum, such unwanted pockets of gas can become unstable as they seek liberation from the layered structure. When this occurs, the layered structures are often damaged, which can adversely affect the performance of any component incorporating such damaged layered structures. When components are used in space, the resistive atmospheric pressure forces that would otherwise exert an inward pressure on layered structures having any gas-filled voids (for example, when the components are subjected to atmospheric pressures on Earth), are absent.

The expansion of the material contained in a void, as well as the presence of voids themselves, can reduce electrical contact, thermal contact, mechanical rigidity, etc. To complicate matters, voids or "bubbles" are difficult to detect during the manufacture and assembly process. Further, even if detected, such voids are also difficult to repair, especially after the bonding material in a bonding layer has dried or cured.

Layered structures that are bonded together, and devoid of "bubbles" would be desirable, particularly when such layered structures are used in components in an extremely low-pressure or vacuum environment, such as, for example, space.

SUMMARY

According to one aspect, the present disclosure is directed to a method for improving bonding while also venting material from a layered structure by reducing the effects of voids in a layered structure. A bonding material layer is applied to a substrate material layer. A wicking material is disposed in the bonding material layer, with the wicking material having a wicking material outer surface. A surface material layer is applied to the bonding material layer. At least one venting path is established in the bonding material layer, with the venting path located immediately adjacent to the wicking material outer surface. In another aspect, the wicking material is resistant to bonding with one or both of the bonding material layer and the surface material layer. The layered structure is cured. According to a further aspect, the contents in the voids in the bonding material (e.g., gaseous material) are evacuated from the voids in the bonding material, and eliminated from the layered structure via the venting path.

In another aspect, the wicking material is fabricated into a form such as at least one of: one or multiple strands, one or multiple one-dimensional meshes, one or multiple two-dimensional meshes, hollow tubes with or without perforations, and combinations thereof.

In a further aspect, the wicking material is made from a material including at least one of a metal, a refractory material, a polymer, a strand of porous or sintered material, and combinations thereof.

In yet another aspect, the wicking material is made from a material including at least one of copper, copper alloys, polytetrafluoroethylene, organic materials, and combinations thereof.

In a still further aspect, the wicking material comprises individual or multiple copper or copper alloy strands.

In another aspect, the wicking material comprises at least one of single or multiple strands of porous material comprising hemp, cotton, asbestos, nylon, and combinations thereof.

In a further aspect, the wicking material is formed into a tubular structure.

In yet another aspect, the wicking material formed into a tubular structure is fabricated to allow selected material such as gaseous material to enter the tubular structure and be evacuated from the layered structure.

In another aspect, the wicking material comprises a material that dissolves upon curing or heating.

In a still further aspect, the wicking material comprises a material that liquefies, sublimates or otherwise reduce its dimension at a predetermined temperature and/or pressure, and combinations thereof. For instance, in some cases, the wicking material sublimates or liquefies during curing or heating of a layered structure as described herein.

In yet another aspect, the wicking material is evacuated from the layered structure, for example, through dissolving, subliming, etc., with the evacuated wicking material establishing a pathway in the layered structure (after the evacuation of the wicking material from the layered structure).

In a further aspect, the wicking material is resistant to bonding with either of or both the bonding material layer and the surface material layer.

In another aspect, before or commensurate with the curing step, a vacuum is applied to the layered structure to remove material from voids in the layered structure. The vacuum may be dimensioned to connect to a part, such as a component, comprising the layered structure.

In another aspect, the material evacuated from the layered structure via the venting path is predominantly a gaseous material.

According to another aspect, the present disclosure is directed to a layered structure comprising a substrate layer, a bonding material layer disposed adjacent to the substrate layer, a wicking material disposed in the bonding material layer with the wicking material having an outer surface, and a surface material layer disposed adjacent to the bonding material layer. The wicking material is understood to establish at least one venting path, with the venting path located immediately adjacent to the wicking material outer surface, or the venting path substantially located in the place of wicking material, if the wicking material melts, dissolves, sublimates, and is evacuated from the bonding material.

In another aspect, the present disclosure is directed to a component comprising a layered structure comprising a substrate layer, a bonding material layer disposed adjacent to the substrate layer, a wicking material disposed in the bonding material layer with the wicking material having an outer surface, and a surface material layer disposed adjacent to the bonding material layer. The wicking material is understood to establish at least one venting path, with the venting path located immediately adjacent to the wicking material outer surface, or the venting path substantially located in the place of wicking material, if the wicking material melts, dissolves, sublimates, and is evacuated from the bonding material. The component may be an external component, such as a solar panel or other exterior panel for use in a reduced pressure environment, such as, for example, space.

In a further aspect, the present disclosure is directed to an object comprising a component comprising a layered structure. The layered structure comprises a substrate layer, a bonding material layer disposed adjacent to the substrate layer, a wicking material disposed in the bonding material layer with the wicking material having an outer surface, and a surface material layer disposed adjacent to the bonding material layer. The wicking material is understood to establish at least one venting path, with the venting path located immediately adjacent to the wicking material outer surface. In another aspect, the venting path is substantially located in the place of wicking material, if the wicking material melts, dissolves, sublimates, and is otherwise evacuated from the bonding material.

In a further aspect, an object, such as a vehicle comprises the layered structure.

In another aspect, the vehicle may be, but is not limited to, a manned or unmanned object or structure. In some cases, the vehicle may be a manned or unmanned object or structure in an atmospheric or space environment. Contemplated objects include manned and unmanned vehicles, such as, for example, aircraft, satellites, rockets, missiles, etc., and further includes manned and unmanned aircraft, spacecraft, objects and structures.

BRIEF DESCRIPTION OF THE DRAWINGS

Figure 1:
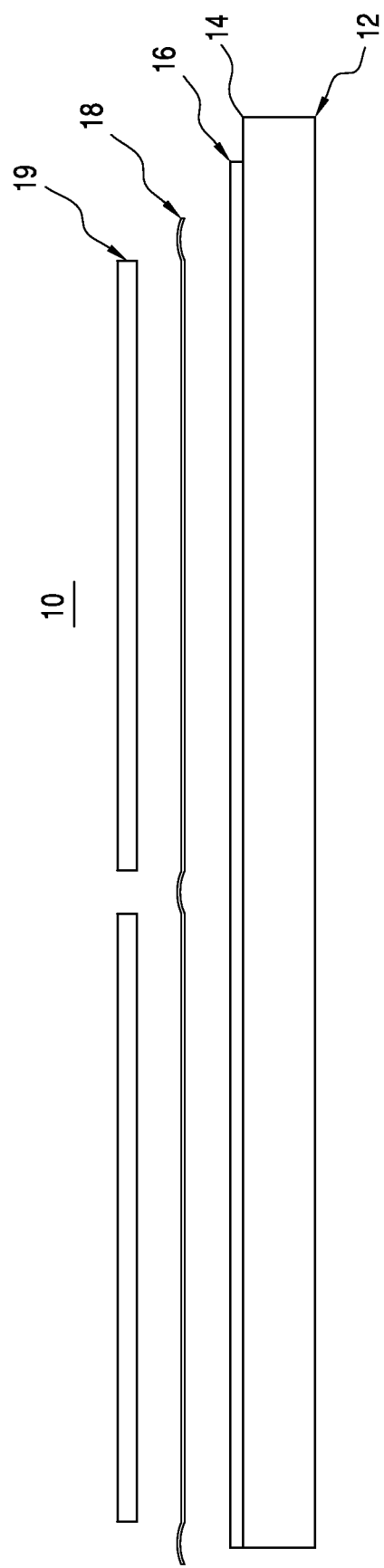
Figure 2:
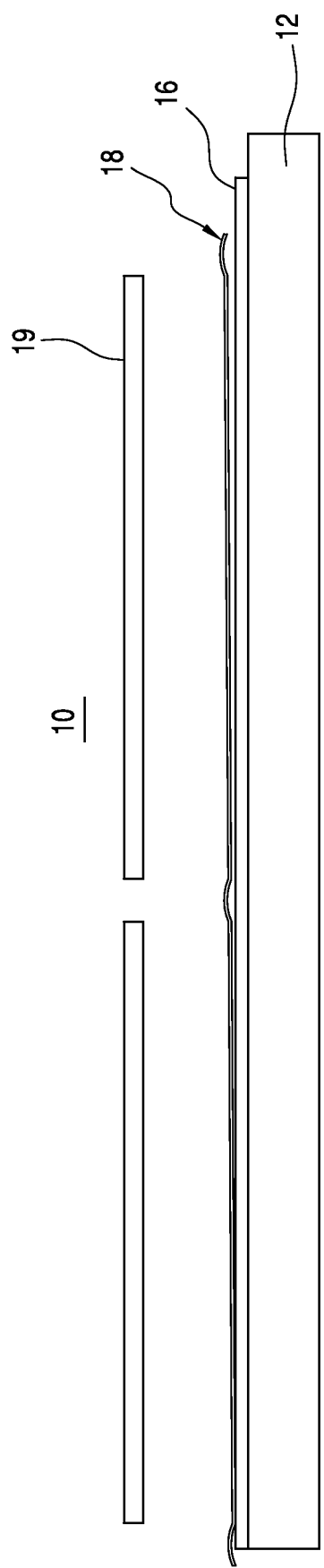
Figure 3:
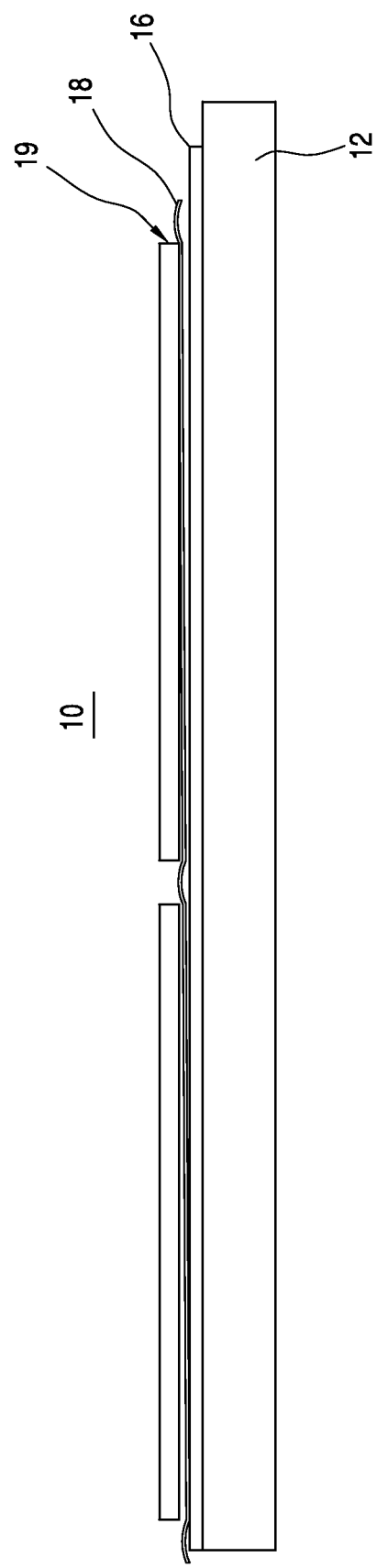
Figure 4:
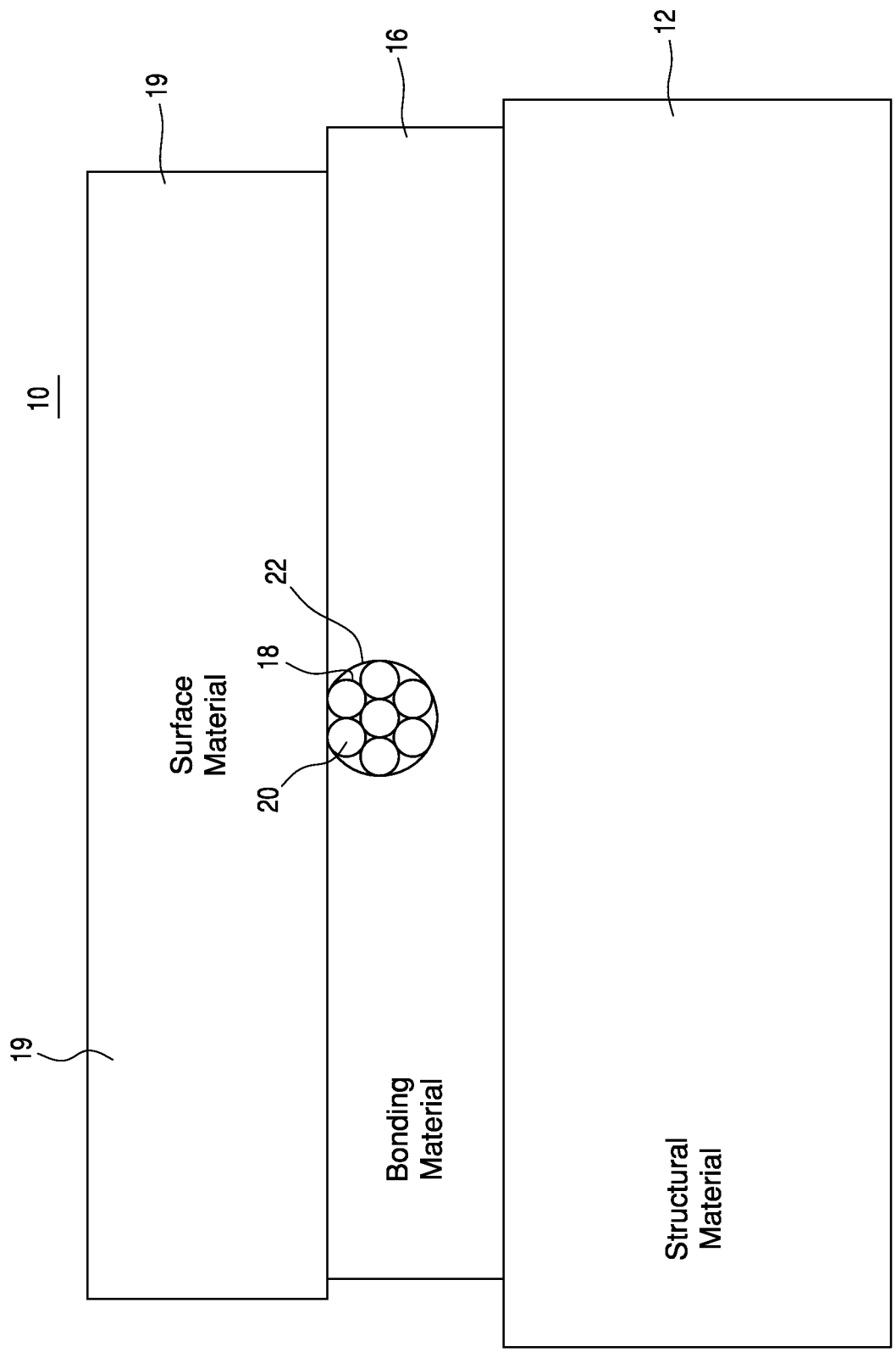
Figure 5:
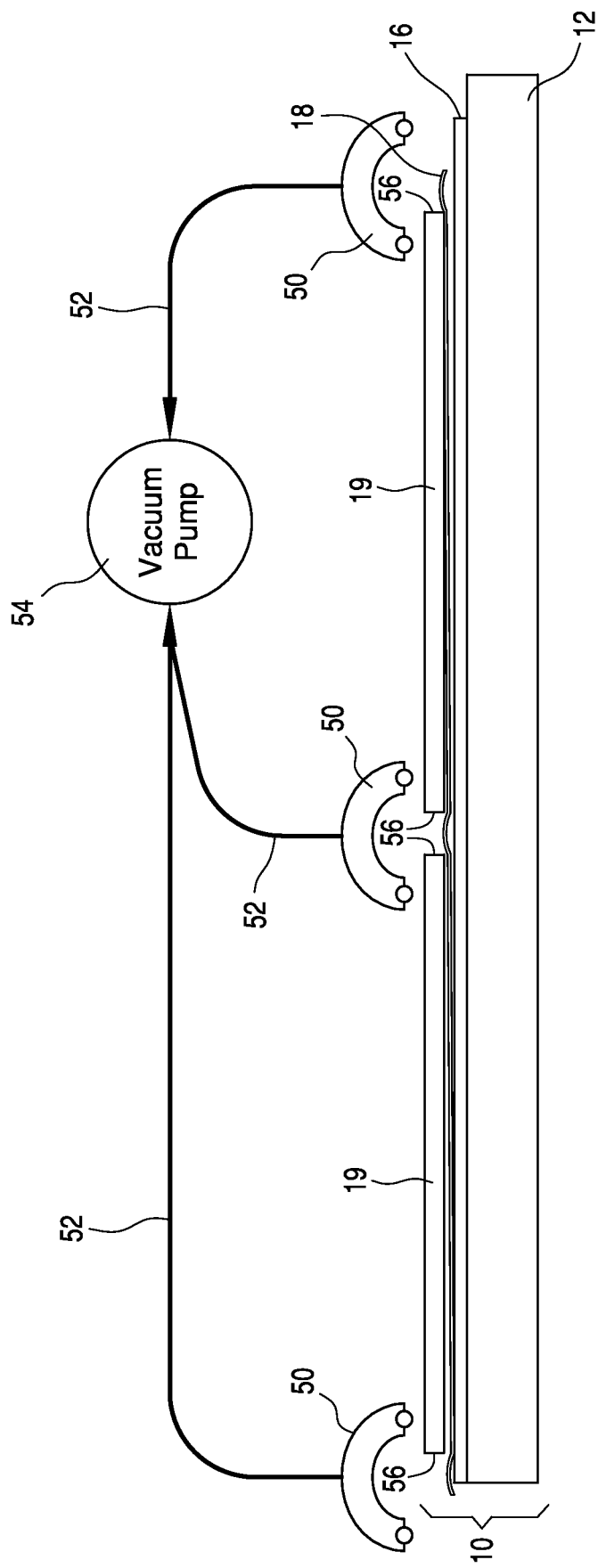
Figure 6:
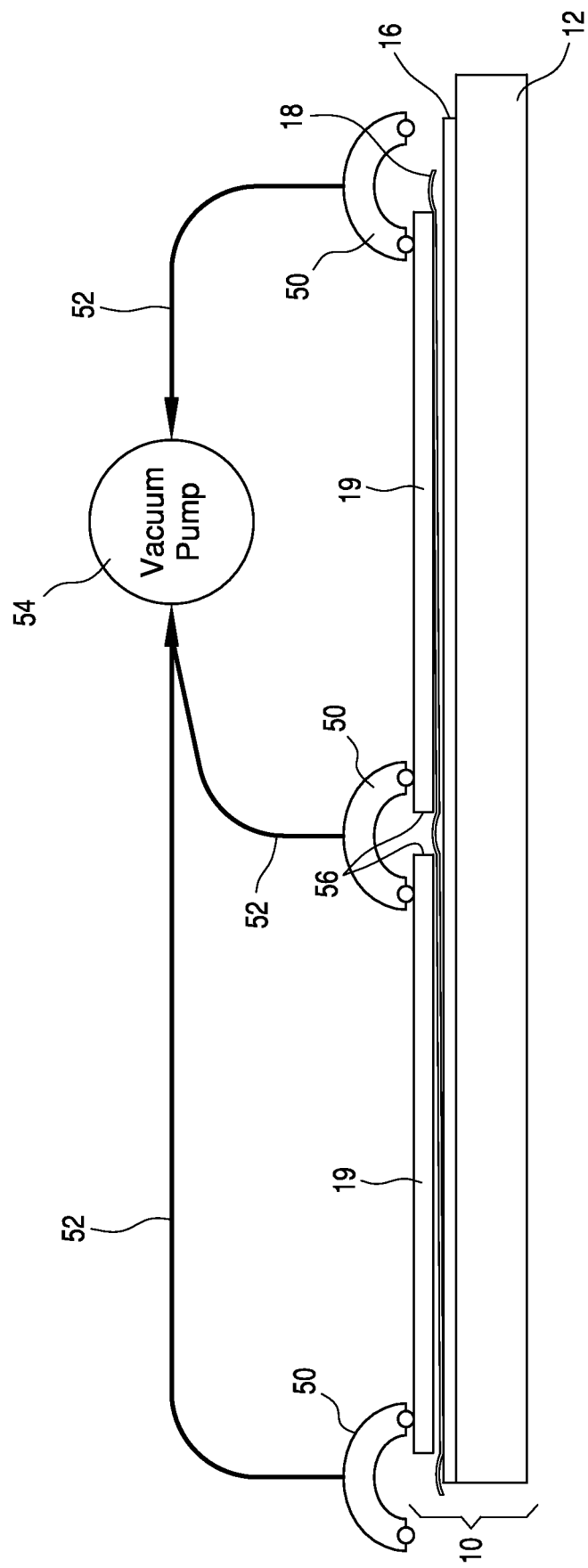
Figure 7:
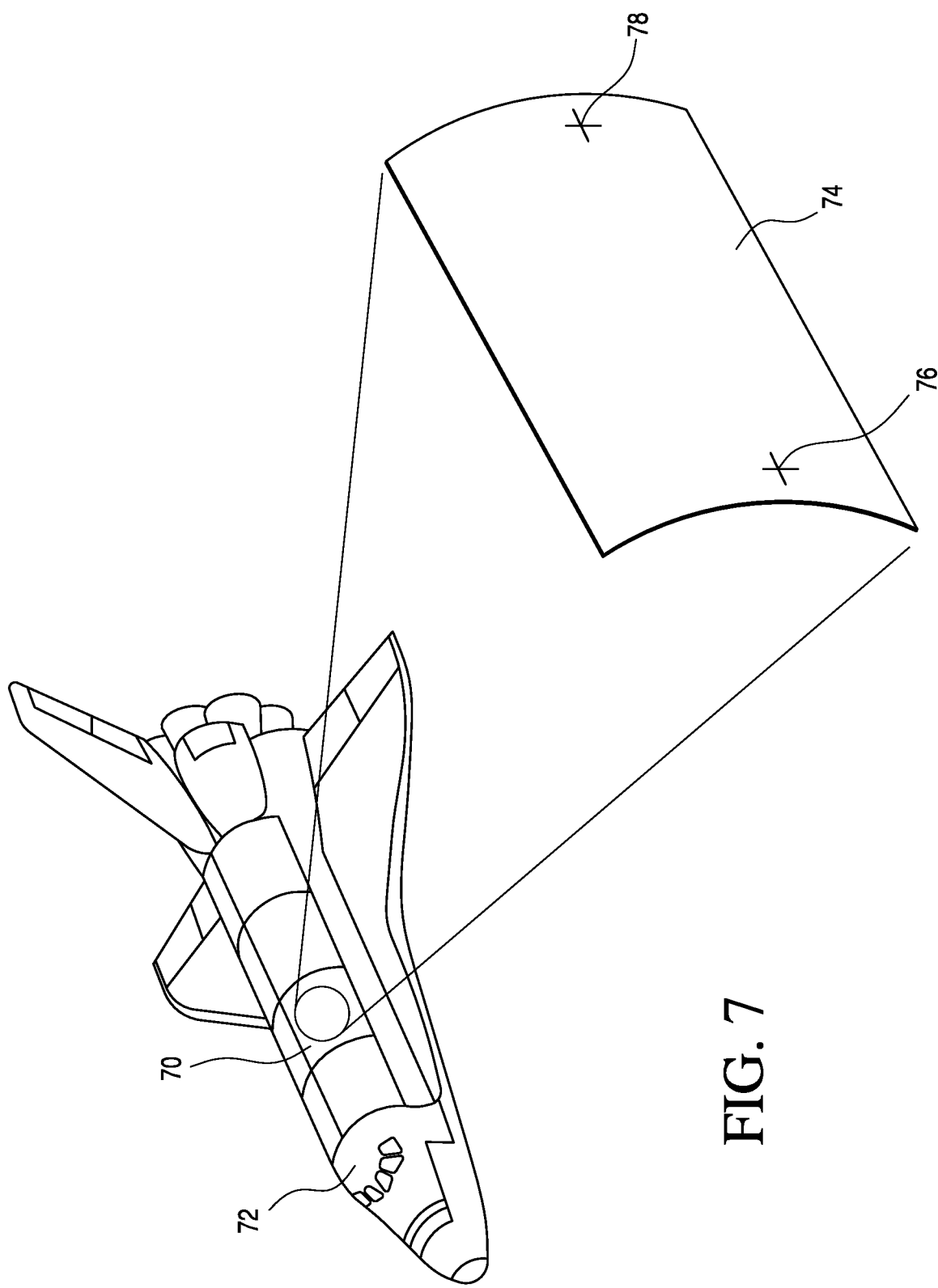

Having thus described variations of the disclosure in general terms, reference will now be made to the accompanying drawings, which are not necessarily drawn to scale, and wherein:

FIG. 1 is a schematic diagram of one aspect of the present disclosure showing a layered structure comprising a wicking material ready for placement within the layered structure;

FIG. 2 is a schematic diagram of one aspect of the present disclosure showing a layered structure with a wicking material brought into contact with a bonding material layer within the layered structure;

FIG. 3 is a schematic diagram of one aspect of the present disclosure showing a layered structure comprising a wicking material in contact with a bonding material layer and a surface layer brought into contact with the bonding material layer;

FIG. 4 is a schematic diagram of one aspect of the present disclosure showing a cross-sectional view of an assembled layered structure comprising a wicking material disposed within a bonding material layer;

FIG. 5 is a schematic diagram of one aspect of the present disclosure showing the assembled layered structure of FIGS. 3 and 4 with a vacuum assembly set to engage the layered structure;

FIG. 6 is a schematic diagram of one aspect of the present disclosure showing the assembled layered structure of FIGS. 3-5 with a vacuum assembly engaging the layered structure; and FIG. 7 is a drawing of a space craft comprising components incorporating the layered structures shown in FIGS. 3 and 4.

Figure 8:
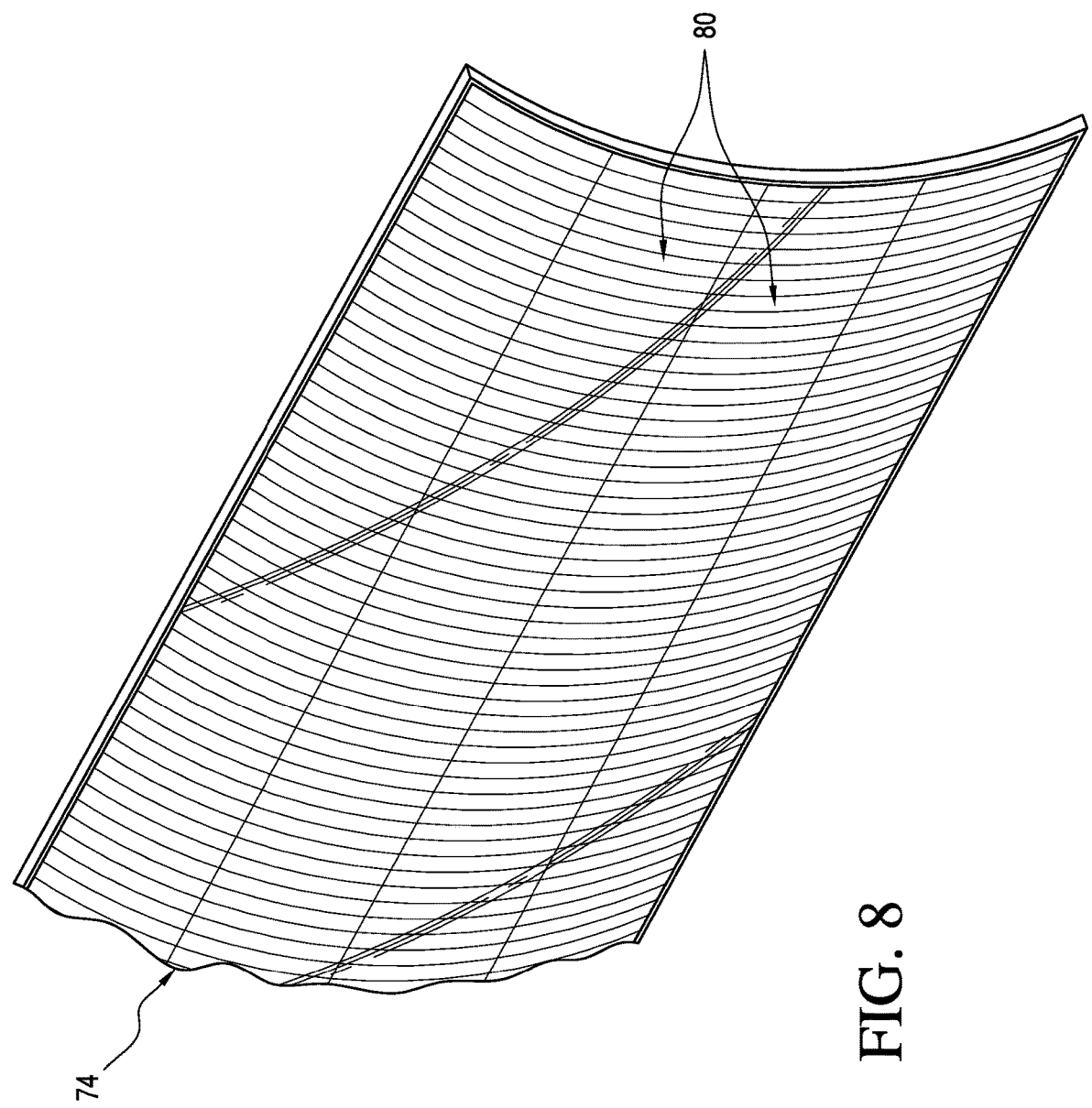

FIG. 8 is a drawing of a solar panel incorporating the layered structures shown in FIGS. 3 and 4.

DETAILED DESCRIPTION

Aspects of the present disclosure are therefore directed to methods, systems and apparatuses for improving the safety, performance, durability, reusability, etc. of layered structures, especially structures for use in low pressure or vacuum or near-vacuum environments, such as, for example, space.

According to the present disclosure, small quantities of a wicking-type material (hereinafter "wicks") introduced between the bonding material used to bond layers in a layered system, with a surface material layer, possibly an intermediate material layer, and substrate material layer that is to be bonded to another layer. The contemplated wicks are disposed between the bonding material and an adjacently oriented layer, such that the wicks are disposed in a predetermined or random orientation or position between the bonding material and, for example, a surface material layer, that is to be bonded to another layer, such as, for example, a substrate material layer.

The wicks are structured and otherwise made from materials that do not bond well with the bonding material layer. In this way, the wicks establish and maintain a small venting path adjacent to the outer surface of the wicks, with the venting path therefore located beneath the surface material layer, and the path extending to an outside edge of the layered structure. The wicks can be made from any of various materials that are chemically and structurally suitable relative to the bonding material used. That is, according to one aspect, the wicks are made from materials selected to not react or bond with the bonding material layer or the surface material layer or intermediate material layer, even after heating, drying and/or curing the bonding material layer. Exemplary wick materials may comprise a metal, a refractory material, a polymer, porous or sintered material, and combinations thereof. Further exemplary wick materials may comprise, without limitation, copper, copper alloys, polytetrafluoroethylene, organic compounds and organic materials and combinations thereof. Any metal or metal alloy may be used that does not chemically or electrically interact with the bonding material layer or the material layers being bonded. Contemplated organic materials include, without limitation, hemp, cotton, asbestos, nylon and combinations thereof. The wick materials may be in a form including, without limitation, single or multiple strands, single or multiple on-dimensional or two-dimensional meshes, hollow tubes that may or may not be perforated, and combinations thereof.

According to the disclosure, the wicks can be made according to a structural form of porous structures or tubes, that are, for example: slit along at least one side; perforated with small holes through their surface that extend into their interior; disposed into twisted (or untwisted) strands of various materials that will allow gases to flow between and among the individual strands; made from dissolvable materials that form "tracks" or pathways in the bonding material layer, with such pathways being continuous or nearly continuous (wherein the dissolvable material used as wicks effectively leave the layered structure upon heating, drying, curing, etc.), or otherwise reduce their overall dimension substantially within the pathway, etc.

The wicks may be in the form of at least one individual strand or multiple strands, single or multiple one-dimensional meshes, single or multiple two-dimensional meshes, etc. Contemplated meshes can be of numerous dimension and configurations including, for example, random strands of varying lengths, a set of parallel strands extending a predetermined distance that is greater than the spacing of material layers being bonded and the bonding layer itself. According to an aspect of the disclosure, the wicks are understood to physically extend beyond at least one outer edge of the layered structure comprising the wick, for the purpose of producing a pathway for the evacuation of any material (e.g. gases) that are trapped in voids existing in the bonding material layer of the layered structure.

According to aspects of this disclosure, the wicks are small enough in dimension and cross-section to not degrade the bonding performance of the bonding material layer. In a further aspect, the wicking material may also be resistant to bonding with the either or both of the bonding material layer and the surface layer material. While the overall adhesion strength of the layered material to the bonding material may be reduced by the ratio of the cross section of the wicking material to the cross section of the layered material. It is understood that, an acceptable reduction of the bonding strength would be calculated by the designer to determine the amount of wicking material that would be acceptable.

Additionally, the wicks provide a natural venting path, or pathway for gases, and other unwanted material that may be contained in voids in the bonding material layer and are effectively "trapped" under a surface material layer or intermediate material layer adjacent the bonding material layer after bonding has occurred. These pathways serve to vent the gases and other unwanted material from the voids to an area outside (beyond) the bond area in the bonding material layer, and out from underneath the surface material and/or intermediate material layer(s). This result is particularly useful in space-based and near-space-based (vacuum) applications. Alternatively, the diameters of the wicks are determined by an analysis of the bonding material used in the bonding material layer to insure that the bonding material does not "fill in", "creep", or otherwise occupy the groves and spaces created by the surface and structural features of the wick itself. The spacing between each strand of the wick is determined by the minimum diameter of the void from which material is being eliminated. In other words, according to an aspect of the present disclosure, it is contemplated that only voids smaller than the spacing between adjacent wicks would be allowed to form upon installation of the wicks into the bonding material layer.

According to further aspects, the wicks may be made from a material that is intended to change state, e.g., dissolve, melt, evaporate or otherwise reduce in dimension or leave the bonding material substantially completely upon exposure to a predetermined temperature range or pressure range. Such materials include wax-like material dimensioned into strands that melt at or above a predetermined temperature or below a predetermined pressure, strands of material made from a material that liquefies at or above a predetermined temperature or below a predetermined pressure, strands of material or sublimate to a gas at or above a predetermined temperature or below a predetermined pressure (e.g., dry ice, etc.), etc., or combinations thereof, as well as materials that dissolve in the presence of certain gases or solvents. Aspects of the disclosure contemplate the use of wick materials comprising, for example, water soluble cellulose-containing materials that can be softened and evacuated from the layered structure by applying water, and pitch-containing materials that can be dissolved in, for example, acetone or other appropriate solvent. Further, the wick material may comprise waxes, or other solids with low melting temperatures. According to this aspect, the layered structure may be subjected to heat or curing required to melt the wick material, and the melted wick material may be evacuated from the layered structure under vacuum.

According to an additional aspect, a vacuum structure, that may be custom fit to the approximate dimension (size and shape) of the surface parts incorporating the bonding material layer comprising the wicks of the present disclosure, can be attached with a small vacuum applied to the outside of the surface material, such as, at the edges thereof. When the vacuum is applied, any gaseous or other unwanted material that is residing in a void will be eliminated ("evacuated") from the bonding material layer or the area between the bonding material layer and the surface material layer (or intermediate material layer if present) adjacent to the bonding material layer of the layered structure in the part or component comprising the layered structure. This vacuum will evacuate the trapped material in the void (gaseous and other unwanted trapped material) out from under the surface using the "leak", or venting pathways, created by the wick strands/fibers that are at the interface between the bonding material layer (most particularly the bonding material layer surface, though in no way restricted to the bonding material layer surface) and the region of the surface material layer or intermediate material layer adjacent to the pathway created in the bonding material layer. Such application of a vacuum in the production of the layered structure will reduce the amount of trapped gases between the layers of the layered structure. Such a process increases the differential pressure between the outer surface material and the bond area, and will concurrently improve bond adhesion of the bonding material.

The contemplated structure of the vacuum fixture will ideally substantially conform to the shape and dimension of the surface materials being bonded such that a reasonably tight, but not necessarily "vacuum tight", seal is created over the exposed bond area between the adjacent edges of the surface material layers (as shown in FIGS. 5-6), or at the edges of the entire layered structure (not shown). By applying such a vacuum, the pressure over the bond material will be decreased. This negative pressure at the surface will lead any trapped gas along the wick/pathway interface towards the vacuum source. As a function of time, the trapped gases in the voids will be induced to escape from under the surface material, and the bond will also cure more efficiently and completely with commensurate improvement achieved relative to adhesion values of the bonding material layer.

FIG. 1 is a schematic exploded side-view of a layered structure 10. A substrate material layer 12 with a substrate material upper surface 14 has a bonding material layer 16 applied to and oriented on the substrate material layer upper surface 14. A wick material 18 is shown oriented between the bonding material layer 16 and an interrupted surface material layer 19.

FIG. 2 is a schematic exploded side-view of the layered structure 10, with the wick material 18 brought into contact with the bonding material layer 16. FIG. 3 is a schematic exploded side-view of the layered structure 10 showing the interrupted surface material layer 19 brought into contact with the bonding material layer 16, with the wick material 18 interposed there between.

FIG. 4 is a schematic cross-sectional close-up end view of the layered structure 10. Substrate material 12 is shown with bonding material layer 16 comprising the wick material 18, shown in the form of multiple strands 20. A pathway 22 is created by the presence of the wick material 18. Pathway 22 is shown as being oriented adjacent the upper surface of bonding material 16 and a surface of surface material layer 19.

FIGS. 5 and 6 are schematic side-view drawings showing an aspect of the present disclosure, wherein a vacuum pump array is applied to the surface layered structure 10. Vacuum fittings 50 are shown in communication with connecting tubing segments 52. Connecting tubing segments 52 extend from the vacuum fittings 50 to a vacuum pump 54. As shown in FIG. 5, the vacuum fittings 50 have not yet been brought into contact with interrupted surface material layer 19. As shown in FIG. 5, the vacuum fittings 50 will engage the interrupted surface material layer 19 at the edges 56 of the interrupted surface material layer 19. In FIG. 6, the vacuum fittings 50 are now shown engaging, in intimate contact, with the interrupted surface material layer 19 at the edges 56 of the interrupted surface material layer 19. Though not shown, it is understood that the vacuum pump array may be designed and the vacuum fittings may be dimensioned to engage the layered structure at any location as desired.

FIG. 7 is a drawing of a vehicle, and, in particular, a spacecraft comprising solar panels 70. Solar panel 74, is an enlarged configuration, as being located at the region of the fuselage at location 72. The marks shown as "+" 76, 78 denote representative locations existing throughout the surface of the solar panel 74 comprising solar cells further comprising the layered structures described according to the methods, systems and apparatuses of the present disclosure. While the drawing shows a spacecraft with a portion of solar panel identified, it is understood that the methods, systems and apparatuses of the present disclosure contemplate use with any material substrate surface of any material that can be used anywhere in the construction of any vehicle, such as, for example a spacecraft, including the interior, exterior or locations there between, and that the spacecraft shown is merely representative of any and all such vehicles.

FIG. 8 is a drawing of a solar panel 74, such as a solar panel 74 of FIG. 7. As illustrated in FIG. 8, solar panel 74 comprises solar cells 80 comprising the layered structures described according to the methods, systems and apparatuses of the present disclosure.

Although aspects of the present disclosure are useful for all materials regardless of the materials' end uses, end-products comprising the layered structures according to the methods, systems and apparatuses of the present disclosure are thought to be particularly useful when used as structural components and parts in the manufacture of, for example, manned or unmanned objects and structures in an atmospheric or space environment. Contemplated objects include structures such as heat shield panels or solar cells for solar panels incorporated into manned and unmanned vehicles, such as, for example, aircraft, satellites, rockets, missiles, etc., and therefore include manned and unmanned aircraft, spacecraft, terrestrial vehicles, non-terrestrial vehicles and even surface and sub-surface water-borne marine vehicles, objects and structures. It is further understood that aspects of the present disclosure describe and contemplate use with unmanned and manned vehicles capable of operation in the upper-atmosphere, and in space, such as, for example, space shuttle heat tiles, solar cells, protective coatings or components (e.g. panels) used on space or other vehicles exposed to a vacuum, etc.

While the preferred variations and alternatives of the present disclosure have been illustrated and described, it will be appreciated that various changes and substitutions can be made therein without departing from the spirit and scope of the disclosure. Accordingly, the scope of the disclosure should only be limited by the accompanying claims and equivalents thereof.

What is claimed is:

1. A method for improving bonding within a layered structure comprising steps of:
    applying a bonding material layer to a substrate layer, wherein the bonding material layer comprises an adhesive;
    disposing a wicking strand consisting of wax in the bonding material layer, wherein the wicking strand at least partially melts to reduce in dimension, thereby creating a pathway in the bonding material layer;
    applying a surface material layer to the bonding material layer to form a layered structure, wherein the pathway allows gas trapped within the bonding material layer or between the bonding material layer and the surface material layer to be evacuated under vacuum, to prevent the gas from seeking liberation when the layered structure is in space or near-space environments, and wherein the surface material layer comprises an exterior of a solar panel; and
    curing the layered structure.

2. The method of claim 1, wherein said wicking strand is resistant to bonding with the bonding material layer.

3. The method of claim 1, wherein the wicking strand comprises at least one of: single or multiple one-dimensional meshes, single or multiple two-dimensional meshes, hollow tubes, or combinations thereof.

4. The method of claim 1, wherein the wicking strand comprises a plurality of strands that are bundled together to form an overall tubular structure.

5. The method of claim 1, wherein the wicking strand has an initial dimension that is reduced at a predetermined temperature and/or a predetermined pressure.

6. The method of claim 5, wherein the wicking strand sublimates or liquefies during curing or heating.

7. The method of claim 1, wherein the wicking strand is at least partially evacuated from the layered structure.

8. The method of claim 1, wherein the wicking strand is resistant to bonding with the bonding material layer.

9. The method of claim 1, wherein, after curing, the method further comprises the step of:
    applying a vacuum to the layered structure to evacuate the gas trapped in a void between the bonding material layer and the surface material layer.

10. A solar panel for an aircraft comprising:
    a substrate layer;
    a bonding material layer oriented adjacent to the substrate layer, wherein the bonding material layer comprises an adhesive;
    a wicking strand consisting of wax that is disposed in the bonding material layer, wherein the wicking strand at least partially melts to reduce in dimension, thereby creating a pathway in the bonding material layer; and a surface material layer disposed adjacent to the bonding material layer, wherein the pathway allows gas trapped within the bonding material layer or between the bonding material layer and the surface material layer to be evacuated under vacuum prior to the aircraft taking flight, to prevent the gas from seeking liberation when the aircraft is in space or near-space environments, and wherein the surface material layer comprises an exterior of the solar panel.

11. The solar panel of claim 10, wherein the wicking strand comprises at least one of: at least one one-dimensional mesh, at least one two-dimensional mesh, at least one hollow tube, or combinations thereof.

12. The solar panel of claim 10, wherein the wicking strand comprises a plurality of strands that are bundled together to form an overall tubular structure.

13. The solar panel of claim 10, wherein the wicking strand comprises a material that changes state upon curing or heating.

14. The solar panel of claim 10, wherein the wicking strand has an initial dimension that is reduced at a predetermined temperature and/or predetermined pressure.

15. The solar panel of claim 10, wherein the wicking strand sublimates or liquefies during heating or curing.

16. The solar panel of claim 10, wherein the wicking strand does not react or bond with the bonding material layer or the surface material layer.

17. The solar panel of claim 10, wherein the aircraft is a spacecraft.

18. The solar panel of claim 10, wherein the wicking strand is positioned at least partially in an upper surface of the bonding material layer such that the wicking strand is in contact with the surface material layer.

19. The solar panel of claim 10, wherein the wicking strand changes state, and wherein a first portion of the wicking strand is subsequently removed from the layered structure with a vacuum or vacuum pump.

20. The solar panel of claim 19, wherein a second portion of the wicking strand remains positioned within the bonding material layer after the first portion is removed.

21. The solar panel of claim 10, wherein the wicking strand comprises the wax, and wherein the wax melts above a predetermined temperature.

* * * * *